No. 678,898. Patented July 23, 1901.
M. O'CARROLL.
BOBECHE LIFTER.
(Application filed Apr. 10, 1900. Renewed Jan. 5, 1901.)
(No Model.)
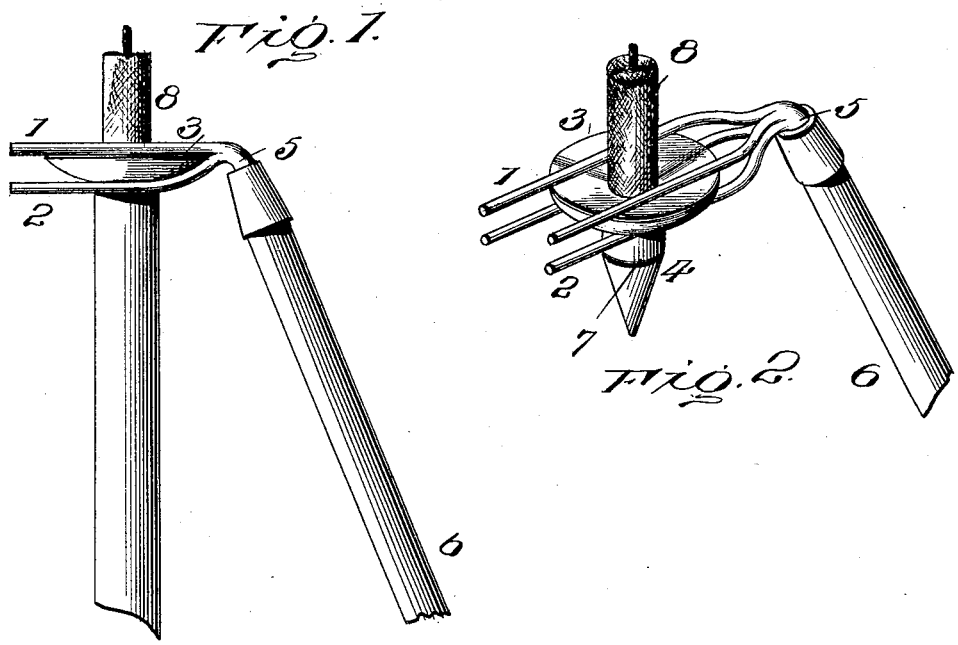
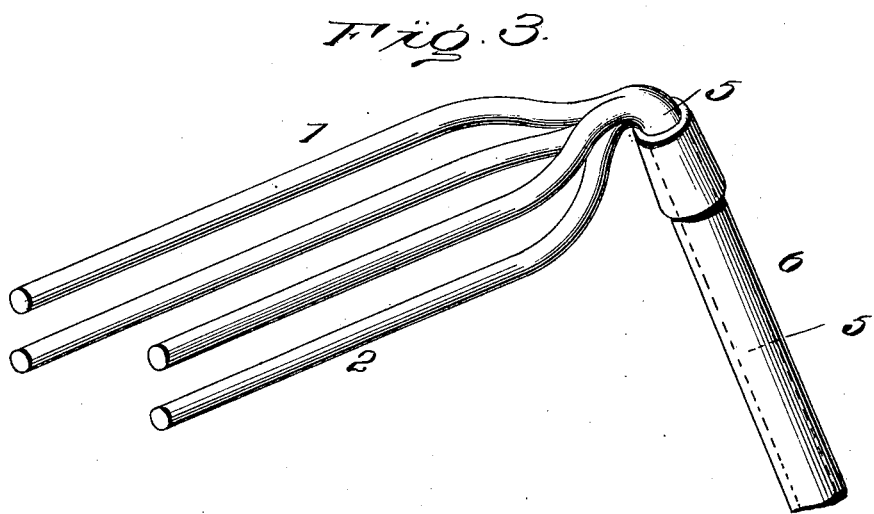
WITNESSES:
INVENTOR
Martin O'Carroll
BY R. H. A. B. Lacey
His Attorneys

UNITED STATES PATENT OFFICE.

MARTIN O'CARROLL, OF OSKALOOSA, IOWA.

BOBÈCHE-LIFTER.

SPECIFICATION forming part of Letters Patent No. 678,898, dated July 23, 1901.

Application filed April 10, 1900. Renewed January 5, 1901. Serial No. 42,242. (No model.)

*To all whom it may concern:*

Be it known that I, MARTIN O'CARROLL, a citizen of the United States, residing at Oskaloosa, in the county of Mahaska and State of Iowa, have invented certain new and useful Improvements in Bobèche-Lifters; and I do hereby declare the following to be a full, clear, and exact description of the invention, such as will enable others skilled in the art to which it appertains to make and use the same.

In churches and other places of divine worship having the altar, sanctuary, or other devotional places decorated by means of burning candles difficulty is experienced in replacing candles in high places and too short for further safe use. The replacement of the candles beyond reach from the floor or platform requires the mounting of the altar or the climbing of a ladder, which is not edifying, and besides is attended with risk and difficulty. High-altar candles, extensions of candelabra, and ordinary candlesticks located beyond reach of the hand are readily accessible by this invention and can be replenished with new candles and have stumps of burned candles removed without requiring climbing upon the altar or the use of a ladder.

The invention consists of a bobèche-lifter comprising upper and lower prongs between which the saucer of the bobèche is received, the candle passing between the tines of the upper prongs and the socket of the bobèche passing between the tines of the lower prongs, the device being attached to a pole or staff of sufficient length to admit of the candle being readily reached.

For a full description of the invention and the merits thereof and also to acquire a knowledge of the details of construction of the means for effecting the result, reference is to be had to the following description and the drawings hereto attached.

While the essential and characteristic features of the invention are necessarily susceptible of modification, still the preferred embodiment of the invention is illustrated in the accompanying drawings, in which—

Figure 1 is a side view showing the application of the lifter for removing or replacing the bobèche. Fig. 2 is a perspective view showing the relation of the bobèche and candle when held by the lifter. Fig. 3 is a perspective view of the lifter.

Corresponding and like parts are referred to in the following description and indicated in all the views of the drawings by the same reference characters.

The lifter comprises an upper prong or fork 1 and a lower prong or fork 2, the tines or members of the respective prongs being substantially parallel and spaced apart a sufficient distance to receive between them the saucer 3 of the bobèche 4. The prongs are of ample length to prevent accidental disengagement of the bobèche when held thereby, and it is essential that the distance between the upper and lower prongs be of such extent as to admit of the saucer 3 passing freely therebetween. This construction admits of the lifter holding the candle in an upright position. The tines of the respective forks spring from a common tang or shank 5, which latter is secured to a pole or staff 6 in any substantial manner and by means of which the lifter is manipulated when in operation. The pole or staff 6 may be of any length and constructed to be lengthened or shortened, so as to adapt the lifter to reach any particular candle required to be replaced. The rear end of the lower prong or fork 2 curves upwardly to the plane of the prong 1, conforming approximately to the lower convex side of the saucer 3.

The bobèche 4 consists, essentially, of a saucer 3, to catch drippings, and a socket 7, into which the lower end of a candle 8 is fitted. As is well understood, the bobèche is detachably fitted to the candle, extension, or socket of the candelabra. The lifter is constructed so as to receive between the tines or members of the respective forks the candle 8 and socket 7 and between the forks themselves the saucer 3 of the bobèche. The lifter is fitted to and removed from the bobèche by an endwise sliding movement, and when the bobèche is held by the lifter it cannot become displaced so long as the forks maintain an approximately horizontal position.

When it is required to remove a spent candle by means of the lifter, the latter is applied in such a position as to receive the saucer 3 between the upper and lower prongs and the candle and socket between the tines of the respective prongs, and when so positioned the lifter is moved horizontally to engage the bobèche and is then elevated to remove it from the candle-stick, extension, or candelabra, when it can be lowered into convenient position to be grasped. The spent candle is replaced by a new one and the reverse of the operation just described is practiced to reposition the bobèche in the replenishing of the high-altar candle, extension, or candelabra, as will be readily comprehended.

Having thus described the invention, what is claimed as new is—

1. A bobèche-lifter comprising upper and lower prongs spaced apart a sufficient distance to receive between them the saucer of the bobèche, substantially as set forth.

2. A bobèche-lifter comprising upper and lower prongs disposed in parallel relation and spaced apart sufficiently far to receive between them the saucer of the bobèche, said prongs springing from a tang or shank common to each, substantially as specified.

3. A bobèche-lifter comprising upper and lower prongs extending approximately in parallel relation and spaced apart sufficiently far to receive the saucer of the bobèche between them, the rear portion of the lower prong curving upwardly and the said prongs springing from a tang or shank common thereto, substantially as described.

In testimony whereof I affix my signature in presence of two witnesses.

MARTIN O'CARROLL. [L. S.]

Witnesses:
W. R. LACEY,
FLORENCE COFFIN.